Oct. 11, 1927.

C. R. SHORT 1,644,749

TRANSMISSION CASING

Filed Nov. 24, 1919

Inventor
Charles R. Short
By Attorneys
Blackmore, Spencer & Flint

Oct. 11, 1927.

C. R. SHORT 1,644,749

TRANSMISSION CASING

Filed Nov. 24, 1919

Inventor
Charles R. Short
By Attorneys
Blackmore, Spencer & Flint

Patented Oct. 11, 1927.

1,644,749

UNITED STATES PATENT OFFICE.

CHARLES R. SHORT, OF DETROIT, MICHIGAN, ASSIGNOR TO GENERAL MOTORS CORPORATION, OF DETROIT, MICHIGAN, A CORPORATION OF DELAWARE.

TRANSMISSION CASING.

Application filed November 24, 1919. Serial No. 340,092.

The invention relates to casings of the type generally employed in motor vehicles for enclosing the clutch and gears with their related parts. It is the object of this invention to provide a casing of this type which shall be simpler in construction than those hitherto in use and which can be more cheaply manufactured. With this object in view the invention comprises broadly a transmission casing whose parts are so proportioned that it may be cast without the use of cores and may be completed with a minimum of machine work. The invention further comprises various details of construction as hereinafter more fully set forth.

The invention also comprises an improved process of manufacture whereby casing constructions of the character mentioned may be produced with a saving of labor and expense.

In the accompanying drawings which form a part of this specification,

Figure 1:
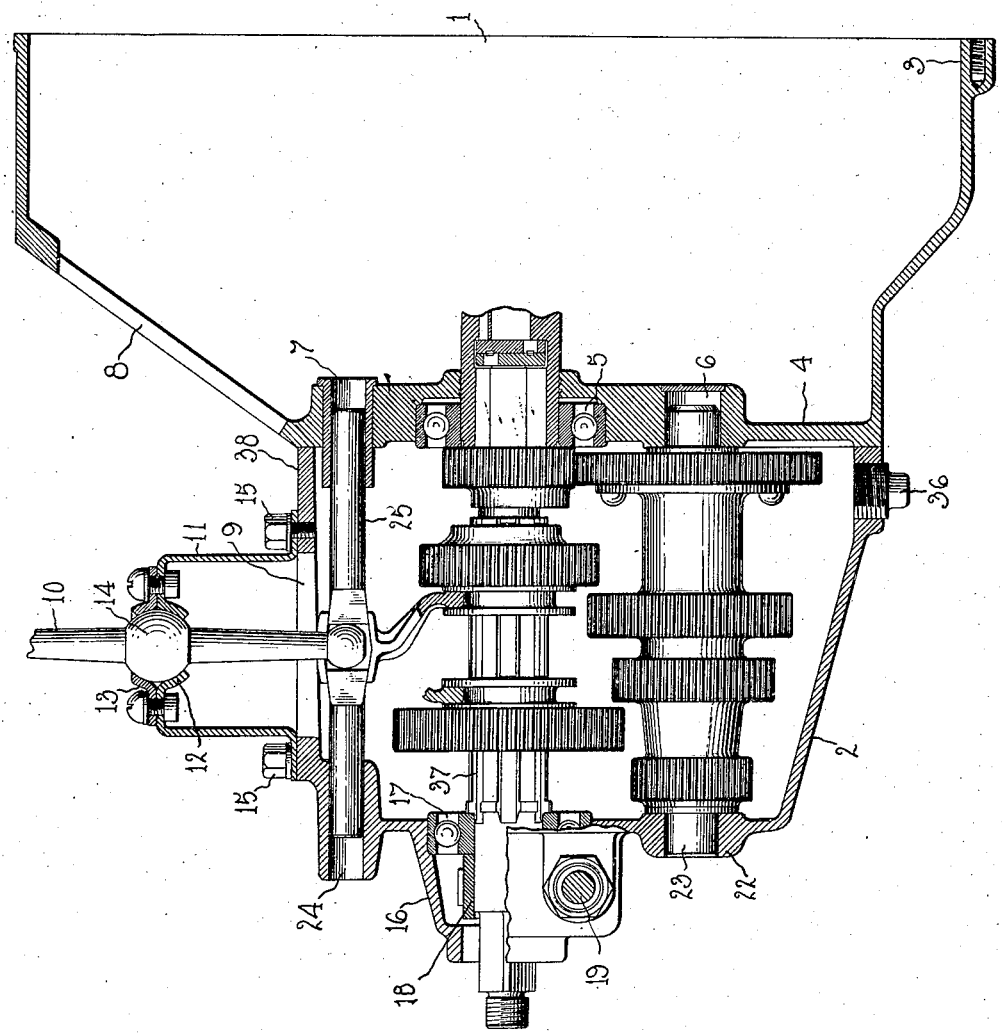
Fig. 1 is a vertical section through the casing showing one embodiment of my invention.
Figure 3:
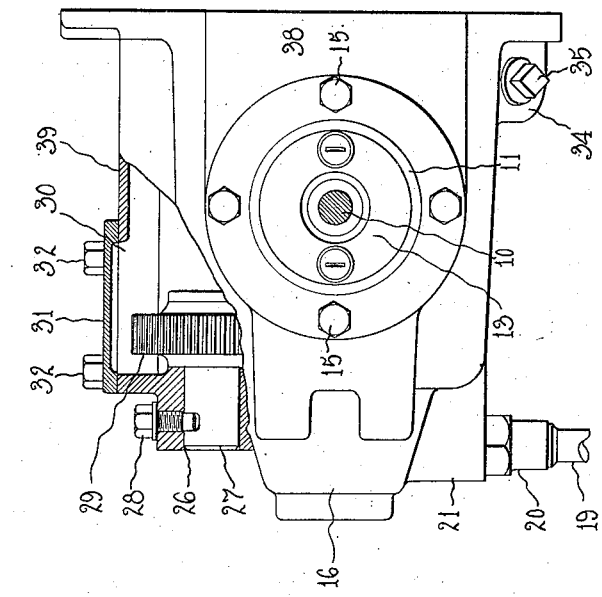
Fig. 3 is a plan showing a portion of the casing in section.
Figure 2:
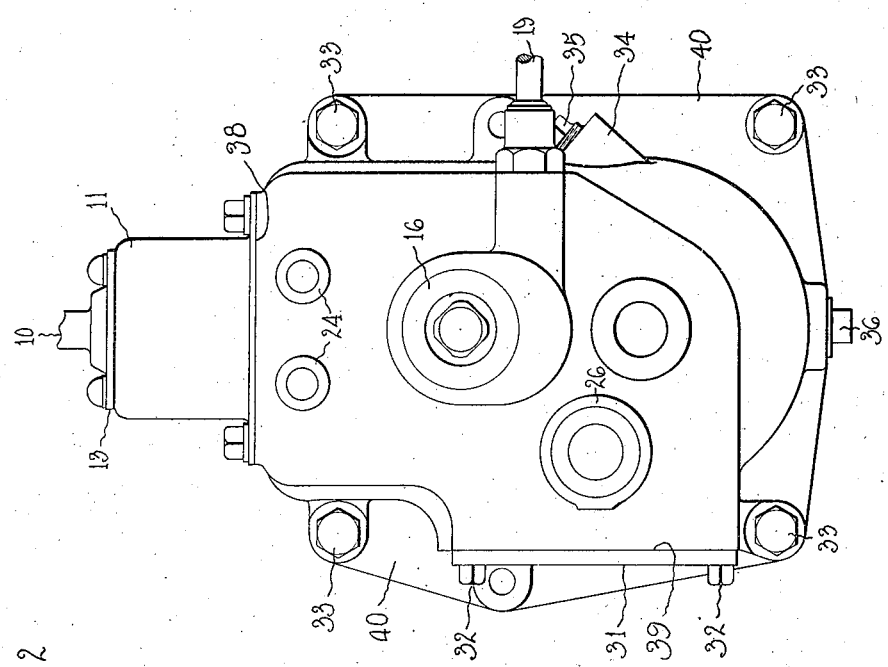
Fig. 2 is an end elevation.

In the drawings 1 indicates the casing section within which the clutch and parts of its operating mechanism may be housed, and 2 indicates the gear casing. The clutch casing 1 is designed to be cast in a single piece which may be done without the use of any cores as there are no projecting or overhanging portions such as would prevent the drawing of the pattern. The forward end of this casing is open and is adapted to be secured to an engine crank case of usual form, tapped lugs 3 being provided for this purpose. The rear end of the clutch casing is closed by a diaphragm 4 which is made of sufficient strength to support a main bearing 5 for the transmission shaft 37 and also to provide a bearing 6 for a counter shaft and one or more supports 7 for gear shifting rods. An opening 8 may also be provided by punching out the wall of the casing in order to permit access to the interior.

The gear casing or box 2, shown as of approximately rectangular cross section, is also open at the forward end and closed at the rear and is so shaped as to be cast in a single piece without coring. In order to facilitate the molding operation it will be noted that I have so proportioned the parts of the casing that on the exterior there are no rearward portions that overhang any forward portion, and on the interior conversely, there are no forward portions that overhang a rearward position. The advantages of this construction from the standpoint of ease and cheapness of manufacture will be obvious to those skilled in the art, and I believe that I am the first to design a gear casing which may be so produced.

The casing 2 is provided on top with an opening 9 which may be punched out after the casing as a whole has been cast. This opening permits the gear shifting lever 10 to extend inside the casing where it may co-operate with gear shifting mechanism of any desired character. The lever may be mounted as shown in a pressed metal support 11 formed with a depression 12 and cap 13 to co-operate with the ball 14 on the lever. The support 11 may be secured to the gear casing in any desired manner, as by bolts 15 engaging in holes drilled in the casing around the aperture 9.

The rear wall of casing 2 is provided with a recessed portion 16 at the forward end of which is a bearing 17 co-operating with bearing 5 to support the main transmission shaft. This recessed portion also houses a gear 18 adapted to transmit motion to a speedometer drive shaft 19 extending laterally through a bearing 20 which may be supported in a drilled aperture in the enlarged portion 21 of the casing. The rear wall of casing 2 is also provided with a bearing 22 for the end of counter shaft 23, and with one or more supports 24 for gear shifting rods 25. Another aperture in the rear wall is shown at 26, which serves to carry a stud or journal 27, secured by a screw 28, on which stud is mounted the reverse gear 29. An opening 30 which may be formed preferably by punching out the side of casing 2 may be closed by cap 31 secured to the casing, as by bolts 32.

Lugs or flanges 40 and bolts 33 provide a means of attachment of casing 2 to the clutch casing 1. An oil hole may be drilled in lug 34, and a screw plug 35 is adapted to close said hole. A drain plug 36 may also be mounted in a thickened portion of the casing wall at the bottom. It will be seen that I have so arranged the thickened or projecting portions providing for the various bearings, apertures, bolts and plugs, that there is no overhang to interfere with the drawing of the pattern.

The shafts 23 and 37 carry selective speed changing gears of the usual or any desired type, and it will be clear that various changes may be made in the specific details of the casing to accommodate gearing of different types.

It will be seen from the drawings that I have provided flattened portions 38, 39, on the exterior of casing 2, which flattened portions form convenient seats for the additional housing elements 11 and 31 or any other housing elements which it may be desirable to attach to the gear casing proper. The necessary openings to co-operate with said elements may be punched out as already mentioned or formed in any other convenient way after the casing has been cast. The interengaging surfaces of the different casing elements as well as the various apertures for bolts or shafts are, of course, machined in the usual manner after the casting is otherwise completed.

I claim:

1. In transmission mechanism for motor vehicles the combination with a set of speed changing gears and the main transmission shaft thereof of a casing for said gears having an end wall provided with a recess through which said shaft extends, a second shaft arranged to extend laterally from said transmission shaft and means in said recess for driving said second shaft from said transmission shaft, said end wall being formed with an aperture extending through the material thereof and communicating with said recess to receive said second shaft.

2. In transmission mechanism for motor vehicles the combination with a set of speed changing gears and a transmission shaft, of a casing for said gears having an end wall through which said shaft extends, said end wall provided with a bearing for said shaft and a recess surrounding said shaft outwardly of said bearing, an aperture being formed in said casing extending transversely to said shaft and communicating with said recess, a speedometer drive shaft in said aperture and means in said recess for actuating said drive shaft from said transmission shaft.

In testimony whereof I affix my signature.

CHARLES R. SHORT.